United States Patent
Yang et al.

(10) Patent No.: US 10,652,340 B2
(45) Date of Patent: May 12, 2020

(54) QUICK RELAY INTERFACE AND TRANSPORT SELECTION

(71) Applicant: Apple Inc., Cupertino, CA (US)

(72) Inventors: Yan Yang, San Jose, CA (US); Joe S. Abuan, Cupertino, CA (US); Zhongren Xu, Cupertino, CA (US); Thuy Park, San Jose, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 15/713,345

(22) Filed: Sep. 22, 2017

(65) Prior Publication Data

US 2018/0091215 A1    Mar. 29, 2018

Related U.S. Application Data

(60) Provisional application No. 62/399,162, filed on Sep. 23, 2016, provisional application No. 62/399,159, filed on Sep. 23, 2016, provisional application No. 62/399,163, filed on Sep. 23, 2016.

(51) Int. Cl.
| | |
|---|---|
| *H04L 29/08* | (2006.01) |
| *H04W 76/10* | (2018.01) |
| *H04B 7/155* | (2006.01) |
| *H04L 29/06* | (2006.01) |
| *H04W 4/80* | (2018.01) |
| *H04W 84/12* | (2009.01) |

(52) U.S. Cl.
CPC ......... *H04L 67/141* (2013.01); *H04B 7/155* (2013.01); *H04L 67/28* (2013.01); *H04L 67/2804* (2013.01); *H04W 76/10* (2018.02); *H04L 67/26* (2013.01); *H04L 67/42* (2013.01); *H04W 4/80* (2018.02); *H04W 84/12* (2013.01)

(58) Field of Classification Search
CPC ... H04L 67/141; H04L 67/2804; H04L 67/28; H04B 7/155; H04W 76/10
See application file for complete search history.

(56) References Cited

U.S. PATENT DOCUMENTS

| | | | |
|---|---|---|---|
| 9,325,941 | B2 | 4/2016 | Yang et al. |
| 9,680,646 | B2 | 6/2017 | Nadathur et al. |
| 10,028,309 | B2 | 7/2018 | Aliyar |
| 10,057,062 | B2 | 8/2018 | Nadathur et al. |
| 10,084,904 | B2 | 9/2018 | De Filippis et al. |
| 2004/0111652 | A1* | 6/2004 | Shoaib ............... H04L 41/0654 714/15 |

(Continued)

*Primary Examiner* — Mohammad S Anwar
(74) *Attorney, Agent, or Firm* — Dickinson Wright RLLP

(57) ABSTRACT

When direct communication, such as via Bluetooth, is unavailable, a communication protocol is used by an initiating communication device and/or a recipient communication device to establish a communication session via a cloud-based relay server. Establishing the communication session, such as a phone call or video streaming, includes setting up at least a first connection or link between the initiating communication device and the relay server, and at least a second connection or link between the relay server and the recipient communication device. Transports and interfaces for the first link and the second link may be selected independently of each other, and at least one of transports and interfaces for the first link and the second link may differ, e.g., the communication session may include asymmetric transport.

20 Claims, 15 Drawing Sheets

(56) References Cited

U.S. PATENT DOCUMENTS

| | | | |
|---|---|---|---|
| 2011/0064018 A1* | 3/2011 | Hottinen | H04W 72/046 370/315 |
| 2014/0156854 A1 | 6/2014 | Gaetano, Jr. | |
| 2014/0188837 A1* | 7/2014 | Zhou | G06F 16/2465 707/709 |
| 2015/0172333 A1 | 6/2015 | Lindstrm et al. | |
| 2015/0350599 A1* | 12/2015 | Yang | H04N 7/15 348/14.02 |
| 2016/0135042 A1 | 5/2016 | Netto et al. | |
| 2016/0191461 A1 | 6/2016 | Wang | |
| 2016/0219435 A1 | 7/2016 | Mistry et al. | |
| 2016/0366195 A1 | 12/2016 | Pattekar et al. | |
| 2016/0380967 A1* | 12/2016 | Moore | H04L 65/1069 709/217 |
| 2018/0091215 A1 | 3/2018 | Yang et al. | |
| 2018/0091601 A1 | 3/2018 | Yang et al. | |

\* cited by examiner

QUICK RELAY INTERFACE AND TRANSPORT SELECTION

CROSS-REFERENCE TO RELATED APPLICATIONS

This Application claims the benefit of U.S. Provisional Patent Application No. 62/399,162, entitled "QUICK RELAY SESSION MANAGEMENT PROTOCOL" filed Sep. 23, 2016, U.S. Provisional Patent Application No. 62/399,159, entitled "QUICK RELAY INTERFACE AND TRANSPORT SELECTION" filed Sep. 23, 2016, and U.S. Provisional Patent Application No. 62/399,163, entitled "QUICK RELAY TRAFFIC MANAGEMENT FOR CLOUD MESSAGING" filed Sep. 23, 2016, the contents of all of which are incorporated by reference herein in their entirety for all purposes.

FIELD

The described embodiments relate, generally, to wireless communication among electronic devices, including establishing and managing relayed communication channels between electronic devices via a relay server.

BACKGROUND

Many electronic devices often work in tandem with each other. For example, wearable or accessory electronic devices (such as smart-watches) often communicate data, configuration information and/or control information with a companion electronic device (such as a smart-phone, a tablet computer or a laptop computer) via a short-range communication protocol, such as Bluetooth® (from the Bluetooth Special Interest Group in Kirkland, Wash.).

However, when the companion electronic device is not proximate to the wearable electronic device, communication via Bluetooth may not be possible. In principle, the companion electronic device and the wearable electronic device can communicate with each other via an intermediate electronic device. For example, the companion electronic device and the wearable electronic device can each communicate with a cloud-based service via an access point in a wireless local area network (WLAN) that is compatible with an Institute of Electrical and Electronics Engineers (IEEE) 802.11 standard (which may also be referred to as 'Wi-Fi').

In practice, indirect communication via a cloud-based service can be time consuming because of long set-up time needed to establish connections and latency associated with signaling overhead. These time delays may degrade the performance or disrupt time-sensitive applications that are executing on the wearable electronic device and/or the companion electronic device.

SUMMARY

Embodiments relating to an initiating communication device that establishes a communication session with a recipient communication device are described. During operation, the initiating communication device may establish the communication session (such as a phone call or video streaming) between the initiating communication device and the recipient communication device via the relay server. Establishing the communication session may involve transport and interface selection for a first link between the initiating communication device and the relay server, and transport and interface selection for a second link between the relay server and the recipient communication device. Moreover, at least one of the transports and the interfaces may differ for the first link and the second link.

The relay server may perform the transport and interface selection for the second link and the recipient communication device after the initiating communication device optionally communicates an invitation and/or an allocation request to establish the communication session. For example, the initiating communication device may transmit the invitation to an intermediate server and/or the allocation request to an allocation server. In addition, the initiating communication device may send an allocation binding request to the relay server and receive from the relay server an allocation binding response (e.g., operation 212). In some cases, the allocation binding request is an 'Allocbind Request'. In some cases, the allocation binding response is an 'Allocbind Response'.

Furthermore, the transport for a given link may be selected in a hierarchical manner based on a predefined hierarchy of transport types. For example, in some implementations, the predefined hierarchy may give preference to User Datagram Protocol (UDP) over Transmission Control Protocol (TCP), and may give preference to TCP over TCP-Secure Socket Layer (SSL). In other implementations, other hierarchical preferences can be implemented.

Additionally, the interface for a given link may be selected based on predefined preferences for different types of interfaces. For example, in the predefined preferences, when a client preference is defined it supersedes other preferences. Similarly, in some implementations, when a preference for a Wi-Fi interface is defined, it supersedes a preference for a cellular-telephone interface.

Note that establishing the communication session may involve setting up two or more links between the initiating communication device and the relay server, the recipient communication device and the relay server, or both. Moreover, the initiating communication device may maintain at least one backup link between at least one of: the initiating communication device and the relay server, and the recipient communication device and the relay server.

Furthermore, the transport and the interface for the first link may be selected independently of the transport and the interface for the second link.

Additionally, the initiating communication device may: dynamically detect changes to one of the interfaces in the communication session; and modify at least one of the first link and the second link based on the detected changes.

Note that the initiating communication device may include at least one processor, and memory that stores a program module that, when executed by the at least one processor, performs at least some of the aforementioned operations.

Other embodiments provide the relay server or the recipient communication device.

Still other embodiments provide a computer-program product for use with the initiating communication device, the recipient communication device or the relay server. This computer-program product includes instructions for at least some of the aforementioned operations (or corresponding counterpart operations) performed by the initiating communication device, the recipient communication device or the relay server.

Still other embodiments provide a method for establishing the communication session. The method includes at least some of the aforementioned operations (or corresponding counterpart operations) performed by the initiating communication device, the recipient communication device or the relay server.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
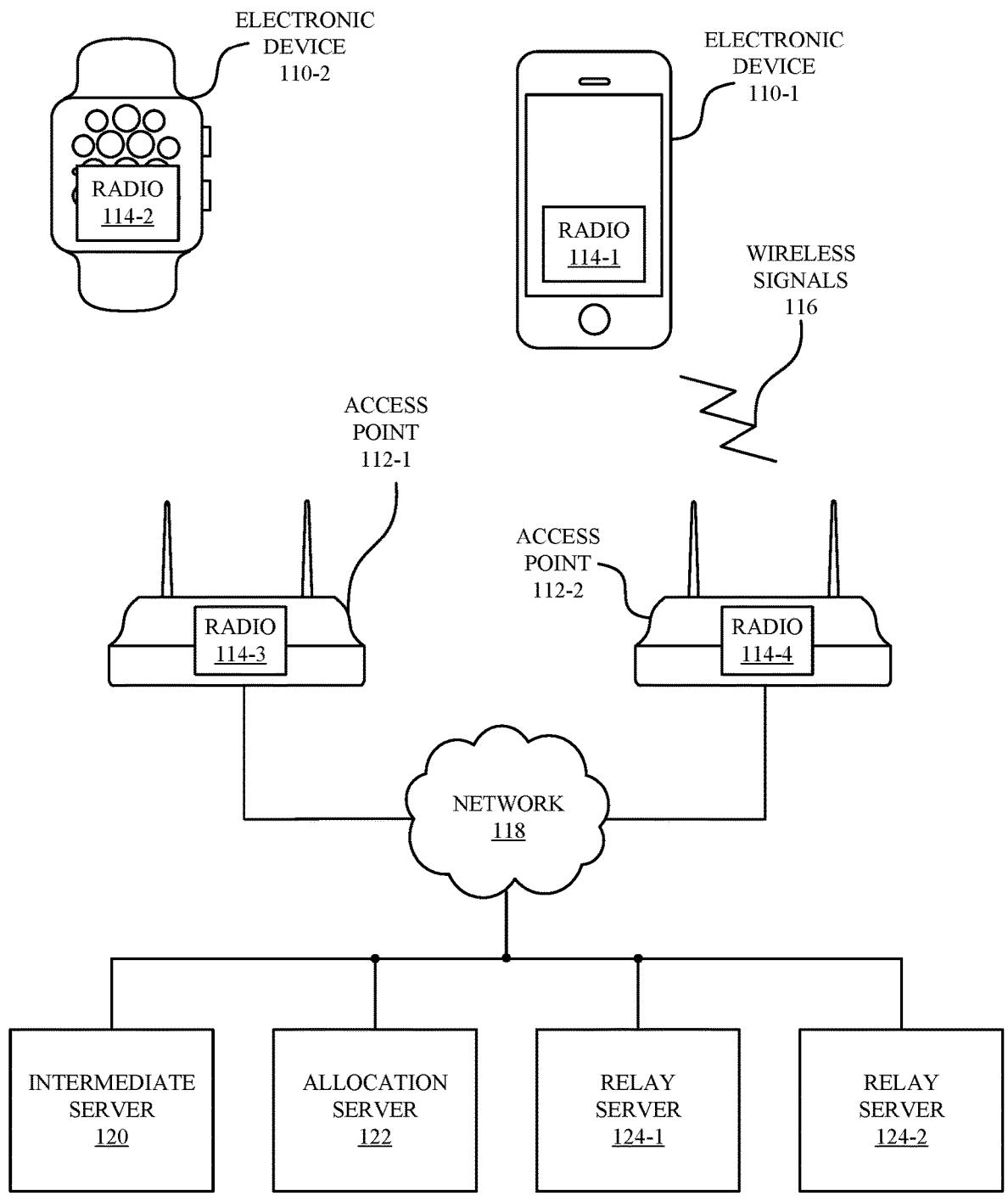
FIG. 1 is a block diagram illustrating an example of electronic devices communicating wirelessly.

Table 1 presents an example of a transport-selection technique that is used by a given communication device to select transport for a link in the communication session.

Table 2 presents an example of interface-selection preferences that are used by a given communication device to select an interface for a link in the communication session.

Note that like reference numerals refer to corresponding parts throughout the drawings. Moreover, multiple instances of the same part are designated by a common prefix separated from an instance number by a dash.

DETAILED DESCRIPTION

When direct communication (such as via Bluetooth) is unavailable, a quick relay communication protocol may be used by an initiating communication device (such as a wearable electronic device, e.g., a smart-watch) and/or a recipient communication device (such as a companion electronic device to the wearable electronic device, e.g., a smart-phone, a tablet computer or a laptop computer) to establish a communication session via a cloud-based relay server. This quick relay communication protocol may efficiently allocate or bind the initiating communication device, the recipient communication device and the relay server in the communication session.

Moreover, establishing the communication session (such as a phone call or video streaming) may include setting up at least a first connection or link between the initiating communication device and the relay server, and at least a second connection or link between the relay server and the recipient communication device. These transports and the interfaces in the first link and the second link may be selected independently or each other, and at least one of the transports and interfaces in the first link and the second link may be different (e.g., the communication session may include asymmetric transport). For example, the transports in the first and second links may be selected in a hierarchical manner based on a predefined hierarchy of transport types, and the interfaces in the first and second links may be selected based on predefined preferences for different types of interfaces.

Furthermore, establishing the communication session may include setting up and maintaining one or more backup links between the initiating communication device and the relay server and/or between the relay server and the recipient communication device. Additionally, the initiating communication device may dynamically detect changes to one of the interfaces in the communication session, and may modify at least one of the first link and the second link based on the detected changes.

By establishing the communication session, this communication technique may allow the initiating communication device and the recipient communication device to efficiently set up the first and second links and to share messages (such as video streaming) even when they are physically distant from each other. Moreover, by allowing the use of asymmetric transport and/or different interfaces, the communication technique may provide flexibility in a variety of communication environments. Furthermore, the on-demand redundant back-up link(s) may provide fault tolerance during the communication session. In addition, the ability to detect and adapt to interface changes may also increase the flexibility and the robustness of the communication session. Consequently, the communication technique may facilitate improved performance during the communication session, such as reduced latency. This may allow the use of time-sensitive applications that are executing on the initiating communication device and/or the recipient communication device. Therefore, the communication technique may improve the user experience when using the initiating communication device and/or the recipient communication device.

Note that the communication by the initiating communication device and the recipient communication device in the quick relay communication protocol may be compatible with a variety of wireless communication protocols, such as: Bluetooth, an IEEE 802.11 standard, a cellular-telephone communication protocol and/or another wireless communication protocol. In the discussion that follows, Wi-Fi communication (e.g., in accordance with an 802.11 standard) with an access point that communicates with a cloud-based relay server using an IEEE 802.3 compatible communication protocol (which is sometimes referred to as 'Ethernet') is used as an illustration. However, the communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

The initiating communication device and/or the recipient communication device (either of which are sometimes referred to as an 'electronic device') can include hardware and/or software to support a wireless personal area network (WPAN) according to a WPAN communication protocol, such as those standardized by the Bluetooth Special Interest Group (in Kirkland, Wash.) and/or those developed by Apple Inc. (in Cupertino, Calif.) that are referred to as AWDL. Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer (P2P) communication technique.

The electronic device, in some embodiments, can also operate as part of a wireless communication system, which can include a set of client devices, which can also be referred to as stations (STAs), client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via Ethernet.

Additionally, it should be understood that the electronic devices described herein may be configured as multi-mode wireless communication devices that are also capable of communicating via, e.g., different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' electronic device, 'mobile device,' 'communication device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Note that the term 'configured to; is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the 'configured to' language include hardware (e.g., circuits, memory storing program instructions executable to implement the operation, etc.). Reciting that a unit/circuit/component is 'configured to' perform one or more tasks is expressly intended not to invoke interpretation under 35 U.S.C. § 112(f) for that unit/circuit/component.

We now describe embodiments of the communication technique. FIG. 1 presents a block diagram illustrating an example of electronic devices communicating wirelessly. One or more electronic devices 110 (such as one or more smart-phones, laptop computers, notebook computers, tablets, smart-watches, wearable devices, or other such electronic device(s)) may communicate with another of electronic devices 110 using Bluetooth (when these electronic devices are in range). Moreover, one or more of electronic devices 110 and one or more access points 112 may communicate wirelessly in a WLAN using an IEEE 802.11 communication protocol. Thus, one or more of electronic devices 110 may be associated with the same or different access points 112. For example, electronic devices 110 and access points 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include requests, responses or acknowledgments and/or additional information, such as data, as payloads). Note that access points 112 may provide access to a network, such as the Internet, (e.g., via an Ethernet protocol) and may be a physical access point or a virtual or 'software' access point that is implemented on a computer or an electronic device.

As described further below with reference to FIG. 15, electronic devices 110 and access points 112 may include subsystems, including any or all of a networking subsystem, a memory subsystem, and a processor subsystem. In addition, electronic devices 110 and access points 112 may include radios 114, e.g., in the networking subsystems. More generally, electronic devices 110 and access points 112 can be implemented as (or can be included within) any electronic devices with networking subsystems that enable electronic devices 110 and access points 112 to wirelessly communicate with one or more other electronic devices. This can include transmitting beacons on wireless channels to enable the electronic devices to make initial contact with or to detect each other, followed by exchanging subsequent data/management frames (such as requests, responses or acknowledgments) to establish a connection, configure security options (e.g., IPSec), transmit and receive packets or frames via the connection, etc.

As can be seen in FIG. 1, wireless signals 116 are communicated by radios 114-1 and 114-4 in electronic device 110-1 and access point 112-2, respectively. More generally, one or more of electronic devices 110 and/or access points 112 may exchange frames using a Wi-Fi communication protocol in a WLAN. As described further below with reference to FIGS. 2 to 14, electronic device 110-1 (which is sometimes referred to as a 'wearable electronic device' or an 'initiating communication device') and electronic device 110-2 (which is sometimes referred to as a 'companion electronic device' or a 'recipient communication device') may communicate packets or messages with one or more access points 112. (It is noted that, while examples may show one device as the initiator, either device may initiate communications.) Moreover, the one or more access points 112 may communicate, via network 118, the packets or messages to intermediate server 120, allocation server 122 and/or one or more relay servers 124 using Ethernet. Furthermore, one or more of relay servers (such as relay server 124-1) may implement a quick relay communication protocol to efficiently establish a communication session between electronic device 110-1, relay server 124-1 and electronic device 110-2.

In these ways, the communication technique may facilitate improved and efficient communication between electronic devices 110-1 and 110-2 even when electronic devices 110-1 and 110-2 are not proximate to each other (such as when they are not within Bluetooth communication range). This capability may improve the performance of time-sensitive applications (such as video streaming, gaming, etc.) that are executing on electronic devices 110-1 and 110-2.

In the described embodiments, processing a packet or frame in one of electronic devices 110 and/or one of access points 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metrics may include any/all of: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1 to 10 seconds) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more, fewer, and/or different electronic devices. As another example, in other embodiments, different electronic devices can be transmitting and/or receiving packets or frames.

Figure 2:
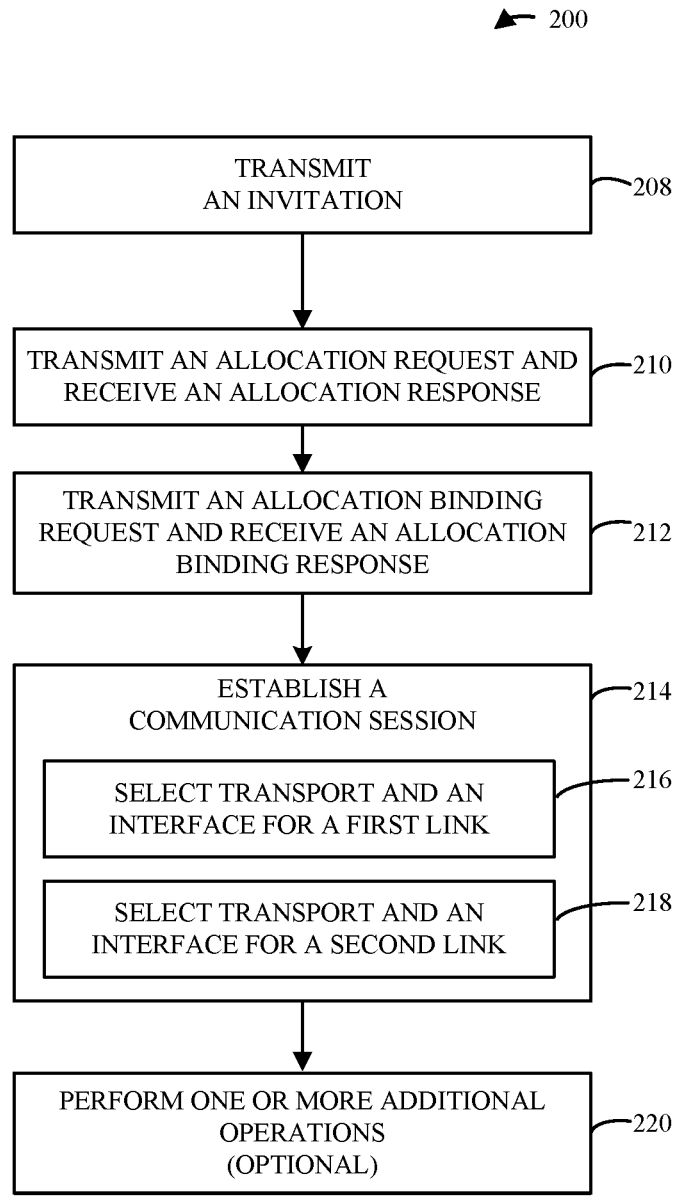
FIG. 2 is a flow diagram illustrating an example of a method for establishing a communication session using at least some of the electronic devices in FIG. 1.

FIG. 2 presents a flow diagram illustrating an example method 200 for establishing a communication session between an initiating communication device and a recipient communication device via a relay server. This method may be performed by an electronic device, such as electronic device 110-1 in FIG. 1. During operation, the initiating communication device may establish the communication session (operation 214) between the initiating communication device and the recipient communication device via the relay server. For example, the communication session may include a phone call or video streaming.

Note that establishing the communication session (operation 214) may involve transport and interface selection for a first link (operation 216) between the initiating communication device and the relay server, and optional transport and interface selection for a second link (operation 218) between the relay server and the recipient communication device. The transport and interface selection for the second link may be performed by the relay server and the recipient communication device after the initiating communication device optionally transmit an invitation (operation 208) and/or an allocation request (operation 210) to establish the communication session. For example, the initiating communication device may transmit the invitation to an intermediate server and/or the allocation request to an allocation server. In response, the initiating communication device may receive, from the allocation server, an allocate response (operation 210) with information identifying the relay server (e.g., the information identifying the relay server may include an address of the relay server). In addition, the initiating communication device may send a binding request, e.g., an Allocbind Request, (operation 212) to the relay server, and may receive a binding response, e.g., an Allocbind Response, (operation 212) from the relay server. The binding request may specify a transport type for the first link between the initiating communication device and the relay server in the communication session and/or the binding response may specify a channel number for this connection in the communication session. Thus, the selection of the transport and the interface for the second link may occur in response to messages communicated by the initiating communication device. Consequently, the selection in operation 218 may be indirect.

Moreover, at least one of the transports and the interfaces can be different for the first link and the second link. Furthermore, the transport for a given link may be selected in a hierarchical manner based on a predefined hierarchy of transport types. For example, the predefined hierarchy may give preference to UDP over TCP, and may give preference to TCP over TCP-SSL. Additionally, the interface for a given link may be selected based on predefined preferences for different types of interfaces. For example, in the predefined preferences, when a client preference is defined it supersedes other preferences, and a Wi-Fi interface can be preferred over a cellular-telephone interface.

In some embodiments, the initiating communication device optionally performs one or more additional operations (operation 220). For example, establishing the communication session (operation 214) may involve setting up two or more links between the initiating communication device and the relay server, the recipient communication device and the relay server, or both. Moreover, the initiating communication device may maintain at least one backup link between at least one of: the initiating communication device and the relay server, and the recipient communication device and the relay server.

Furthermore, the transport and the interface for the first link may be selected independently of the transport and the interface for the second link.

Additionally, the initiating communication device may: dynamically detect changes to one of the interfaces in the communication session; and modify at least one of the first link and the second link based on the detected changes.

In some embodiments, using the communication session, the initiating communication device may send first data to and/or receive second data from the recipient communication device via the relay server.

Moreover, the initiating communication device may receive, from the relay server, a reallocation indication, indicating that another relay server will be used for the communication session. For example, the reallocation indication may be based on a location of the initiating communication device. In response, the initiating communication device may send, to the relay server, a reallocation request, and may receive, from the relay server, a reallocation response. Then, the initiating communication device may communicate data with the recipient communication device via the other relay server. Alternatively or additionally, the reallocation may be initiated and performed with the initiating communication device.

Furthermore, after a time interval without communication with the recipient communication device via the relay server (such as at least 10 to 30 seconds), the initiating communication device may transmit a keep-alive message to the relay server.

Note that the initiating communication device may exchange connection data with the recipient communication device via the relay server by transmitting connection data to the relay server, which forwards the connection data to the recipient communication device. In some cases, the recipient communication device can also send connection data to the initiating communication device via the relay server. While connection data can be exchanged via the relay server, in some cases, P2P communication can also (or alternatively) be established, e.g., via a P2P setup request and response exchange directly between local, e.g., initiating, and remote, e.g., recipient, communication devices.

Additionally, the initiating communication device may discontinue the communication session by transmitting, to the relay server, a disconnect request.

Figure 3:
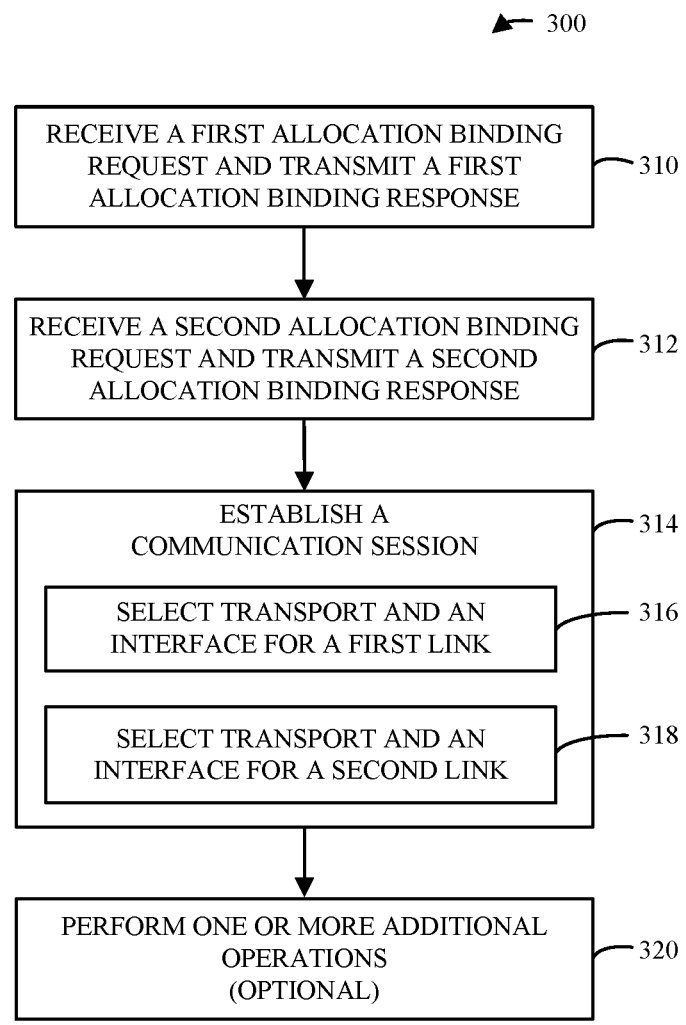
FIG. 3 is a flow diagram illustrating an example of a method for establishing a communication session using at least some of the electronic devices in FIG. 1.

FIG. 3 presents a flow diagram illustrating an example method 300 for establishing a communication session between an initiating communication device and a recipient communication device via a relay server. This method may be performed by a relay server, such as one of relay servers 124 in FIG. 1. During operation, after receiving a first allocation binding request, e.g., an 'Allocbind Request', from the initiating communication device (operation 310) and providing a first allocation binding response, e.g., an 'Allocbind Response', (operation 310), the relay server may establish the communication session (operation 314) between the initiating communication device and the recipient communication device via the relay server. In some embodiments, the relay server optionally receives a second allocation binding request, e.g., another 'Allocbind Request', (operation 312) and provides a second allocation binding response, e.g., another 'Allocbind Response', (operation 314) to the recipient communication device.

Note that establishing the communication session (operation 314) may involve transport and interface selection for a first link (operation 316) between the initiating communication device and the relay server, and optional transport and interface selection (operation 318) for a second link between the relay server and the recipient communication device.

For example, the relay server may respond to operation commands received from a given communication device (such as one of the initiating communication device and the recipient communication device) as the given communication device selects the transport for a given link based on the predefined hierarchy of transport types. Additionally, the relay server may respond to operation commands received from the given communication device as the given communication device selects the interface for a given link based on the predefined preferences for different types of interfaces. Note that at least one of the transports and the interfaces are different for the first link and the second link.

In some embodiments, the relay server optionally performs one or more additional operations (operation 320). For example, establishing the communication session (operation 314) may involve setting up two or more links between the initiating communication device and the relay server, the recipient communication device and the relay server, or both. Moreover, the relay server may maintain at least one backup link between at least one of: the initiating communication device and the relay server, and the recipient communication device and the relay server.

Furthermore, the transport and the interface for the first link may be selected independently of the transport and the interface for the second link.

In some embodiments, using the communication session, the relay server facilitates communication of data between the initiating communication device and the recipient communication device.

Moreover, the relay server may provide, to the initiating communication device, a reallocation indication indicating that another relay server will be used for the communication session. For example, the reallocation indication may be based on a location of the initiating communication device, such as an Internet Protocol (IP) address. Then, the relay server may receive, from the initiating communication device, a reallocation request, and may send, to the initiating communication device, a reallocation response. Alternatively or additionally, the reallocation may be initiated and performed with the initiating communication device or the recipient communication device.

Additionally, after a time interval without communication with the recipient communication device via the relay server (such as at least 10 to 30 seconds), the relay server may receive, from the initiating communication device, a keep-alive message. This keep-alive message may be forwarded on to the recipient communication device. Subsequently, a keep-alive response may be received from the recipient communication device, and this keep-alive response may be forwarded on to the initiating communication device.

In some embodiments, the relay server facilitates establishing a P2P link between the initiating communication device and the recipient communication device. Moreover, the relay server may discontinue or disconnect the communication session based on a disconnect request that is received from the initiating communication device and/or the recipient communication device.

Figure 4:
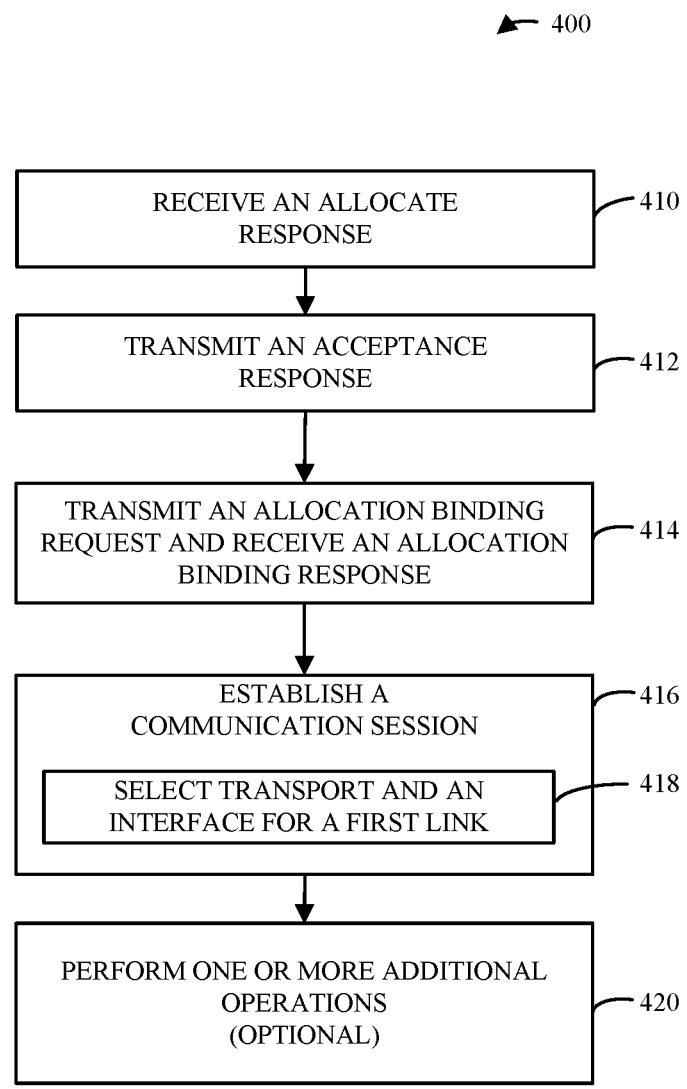
FIG. 4 is a flow diagram illustrating an example of a method for establishing a communication session using at least some of the electronic devices in FIG. 1.

FIG. 4 presents a flow diagram illustrating an example method 400 for establishing a communication session between an initiating communication device and a recipient communication device via a relay server. This method may be performed by an electronic device, such as electronic device 110-2 in FIG. 1. During operation, the recipient communication device may receive, from an allocation server, an allocate response (operation 410) with information identifying the relay server (e.g., the information identifying the relay server may include an address of the relay server).

Then, the recipient communication device may transmit, directly or indirectly to the initiating communication device, an acceptance response for the communication session (operation 412). For example, the recipient communication device may send an acceptance-response request to an intermediate server, and may receive, from the intermediate server, an acceptance-response response. Subsequently, the intermediate server may send the acceptance response to the initiating communication device.

Moreover, the recipient communication device may transmit, to the relay server, an allocation binding request, e.g., an 'Allocbind Request', (operation 414) to bind the relay server and the recipient communication device in the communication session, and may receive, from the relay server, an allocation binding response, e.g., an 'Allocbind Response', (operation 414). Note that the allocation binding request may specify a transport type for a connection between the recipient communication device and the relay server in the communication session and/or the allocation binding response may specify a channel number for this connection in the communication session.

Furthermore, the recipient communication device may establish the communication session (operation 416) between the recipient communication device and the initiating communication device via the relay server.

Note that establishing the communication session (operation 416) may involve transport and interface selection for the second link (operation 418) between the relay server and the recipient communication device. For example, the recipient communication device may provide operation commands to the relay server to select the transport and the interface for the second link. In some embodiments, the transport is selected by the recipient communication device based on the predefined hierarchy of transport types and/or the interface is selected based on the predefined preferences for different types of interfaces. Note that at least one of the transports and the interfaces can be different for the first link and the second link.

In some embodiments, the recipient communication device optionally performs one or more additional operations (operation 420). For example, establishing the communication session (operation 416) may involve setting up two or more links between the recipient communication device and the relay server, or both. Moreover, the recipient communication device may maintain at least one backup link between the recipient communication device and the relay server.

Furthermore, the transport and the interface for the second link may be selected independently of the transport and the interface for the first link.

In some embodiments, using the communication session, the recipient communication device communicates data with the initiating communication device via the relay server.

Moreover, the allocate response may be communicated from the allocation server via the intermediate server. In some embodiments, prior to receiving the allocate response (operation 410), the recipient communication device receives, from the intermediate server, an invitation to establish the communication session via the relay server.

Furthermore, the recipient communication device may receive, from the relay server, a reallocation indication indicating that another relay server be used for the communication session. For example, the reallocation indication may be based on a location of the recipient communication device. In response, the recipient communication device may send, to the relay server, a reallocation request, and may receive, from the relay server, a reallocation response. Then, the recipient communication device may communicate data with the initiating communication device via the other relay server. Alternatively or additionally, the reallocation may be initiated and performed with the recipient communication device.

Additionally, after a time interval without communication with the initiating communication device via the relay server (such as at least 10 to 30 seconds), the recipient communication device may transmit a keep-alive message to the relay server.

In some embodiments, the recipient communication device establishes a P2P link with the initiating communication device via the relay server by transmitting, to the relay server, a P2P-connection request, which is forwarded to the initiating communication device.

Note that the recipient communication device may discontinue the communication session by transmitting, to the relay server, a disconnect request.

Moreover, there may be additional, fewer, or different operations in methods 200, 300 and/or 400. Furthermore, the order of the operations may be changed, and/or two or more operations may be combined into a single operation.

In some embodiments, at least some of the operations in methods 200 (FIG. 2), 300 (FIG. 3) and/or 400 (FIG. 4) are performed by processors in the access point, the relay server or the electronic devices. For example, at least some of the operations may be performed by a processor that executes a program module or software and/or an interface circuit (such as such as firmware associated with a Media Access Control layer, as well as one or more circuits in a physical layer) in the access point, the relay server or the electronic device.

Representative Embodiments

As an illustration of the communication technique, a wearable electronic device (such as a smart-watch) and a companion electronic device (such as a smart-phone) may be capable of communicating with each other using cloud-based messaging. Note that the wearable electronic device may be used by a first user and the companion electronic device may be used by a second user, who may be the same as or different from the first user (such as people in the same family). Moreover, note that a companion electronic device-wearable electronic device relationship may mean that it is desired for these devices to share information with each other so that they have common, coordinated and/or synchronized user data on both devices, such as communication data (emails, texts), media (e.g., songs, images, one-way screen sharing and/or videos), etc. The companion electronic device-wearable electronic device relationship may also mean that the companion electronic device may have the ability to control at least certain aspects of the wearable electronic device, such as the companion electronic device being able to act as a communication proxy for the wearable electronic device or being able to perform management duties (such as data entry and registration) for the accessory device.

For example, the wearable electronic device and the companion electronic device may communicate messages to each other to share information, such as emails, text messages, calendar information, media library items, voice conversations, video, etc. This communication may occur through the use of multiple pipes, e.g., multiple communication mechanisms. Notably, messages may be routed between the wearable electronic device and the companion electronic device when these devices are directly connected (e.g., via Bluetooth) and when the devices are connected to a common network infrastructure device, such as a common access point. When these direct and/or common infrastructure connections are unavailable, the wearable electronic device and the companion electronic device may communicate messages between them using a relay server. This cloud-based communication may enable the wearable electronic device and the companion electronic device to share messages even when they are physically distant from each other. Thus, if a user walks to a coffee shop with his smart-watch, and leaves his smart-phone at home (or vice versa), the smart-phone and the smart-watch may be able to communicate messages with each other via the relay server.

In order to facilitate establishing a communication session in the communication technique, the wearable electronic device and the companion electronic device may each have been previously registered with at least a cloud-based server (such as the intermediate server), which facilitates communication among the wearable electronic device, the allocation server, the relay server and/or the companion electronic device. For example, the registration may be associated with a cloud-based account of one or more users, such as an owner of the wearable electronic device and/or the companion electronic device. In some embodiments, one of the wearable electronic device and the companion electronic device is registered with the cloud-based server, and the other of the wearable electronic device and the companion electronic device may, by virtue of its pairing with the registered device, may be automatically registered to the same cloud-based account.

Figure 5:
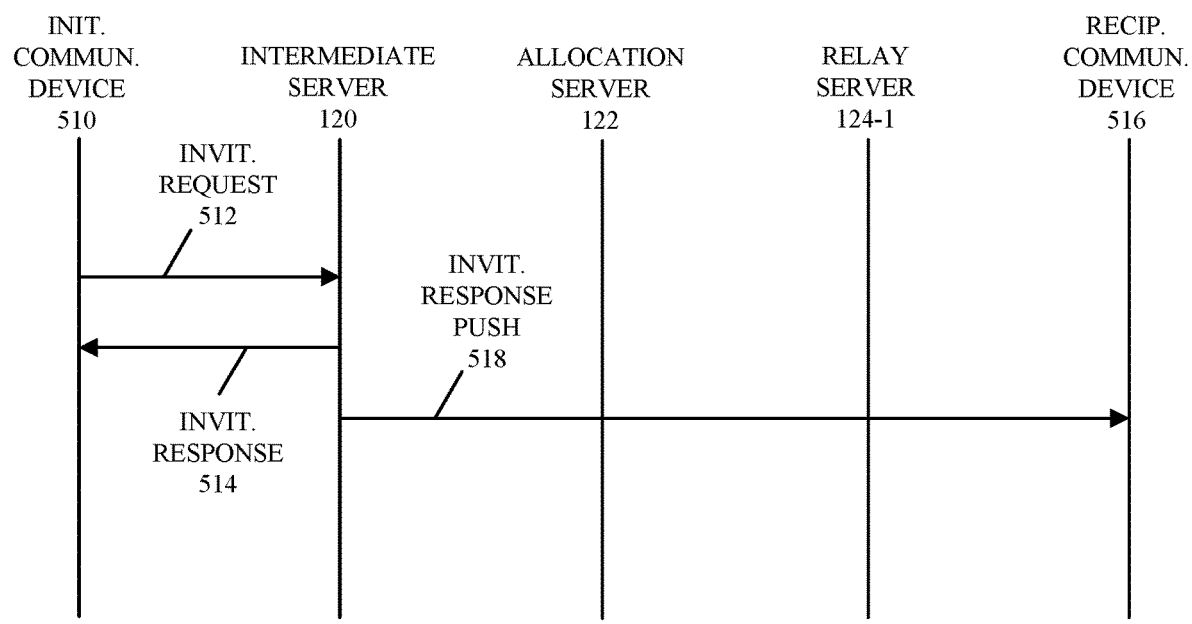
FIG. 5 is a flow diagram illustrating an example invitation operation during communication among at least some of the electronic devices in FIG. 1.

We now describe embodiments of the communication protocol in the communication technique. FIG. 5 presents a flow diagram illustrating an invitation operation during communication among at least some of the electronic devices in FIG. 1. During the invitation operation in the communication protocol, initiating communication device 510 may transmit an invitation request 512 to intermediate server 120, which responds with invitation response 514 (which is sometimes referred to as an 'invitation') to initiating communication device 510 and invitation response push 518 to recipient communication device 516. For example, a processor executing a program module or software in initiating communication device 510 may instruct an interface circuit in initiating communication device 510 to transmit invitation request 512. This may occur when initiating communication device 510 is unable to directly communicate with recipient communication device 516 (e.g., using Bluetooth), based on a type of message or data being communication (e.g., based on a type of application associated with the data), based on message permissions (e.g., a message priority), based on resource constraints (e.g., residual battery power in initiating communication device 510) and/or based on communication performance. Note that initiating communication device 510 and recipient communication device 516 may be pre-registered with intermediate server 120, e.g., intermediate server 120 may maintain user accounts or cloud-based accounts with information such as the locations or addresses of initiating communication device 510 and recipient communication device 516, as well as those of allocation server 122 and relay servers 124.

Figure 6:
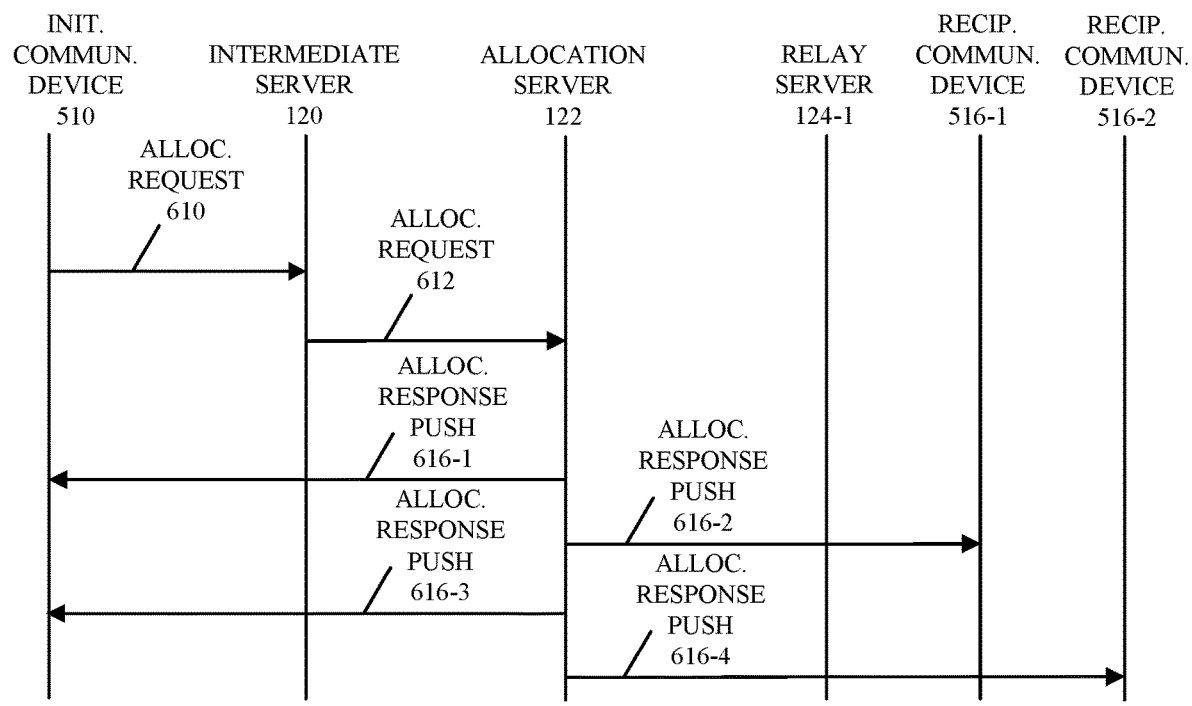
FIG. 6 is a flow diagram illustrating an example allocation operation during communication among at least some of the electronic devices in FIG. 1.

FIG. 6 presents a flow diagram illustrating an allocation operation during communication among at least some of the electronic devices in FIG. 1. During the allocation operation, initiating communication device 510 may transmit an allocate request 610 (which may also be referred to as an 'allocation request') to intermediate server 120, which then sends an allocate request 612 to allocation server 122. In response to allocate request 612, allocation server 122 may transmit one or more allocate response push 616 (which may also be referred to as an 'allocate response') messages to initiating communication device 510 and/or one or more allocate response push 616 messages to one or more recipient communication devices 516, e.g., recipient communication devise 516-1 and 516-2. In some cases, each pair of allocate response push messages corresponds to a different recipient communication device 516, e.g., allocate response push messages 616-1 and 616-2 correspond to recipient communication device 516-1, while allocate response push messages 616-3 and 616-4 correspond to recipient communication device 516-2. Note that the one or more allocate response push messages 616 may include information, such as: a relay-server address, a relay-session identifier, a relay-session key (e.g., an encryption key or a secure hashing function), and/or a relay-session token. In some embodiments, instead of first performing the invitation operation in FIG. 5, initiating communication device 510 may start establishing a communication session using the allocation operation.

The given communication device may select a transport for a link with relay server 124-1 based on a predefined hierarchy. This is shown in Table 1, which presents an example of a transport-selection technique that is used by the given communication device to select the transport for a link in the communication session. Moreover, the given communication device may select an interface for a link with relay server 124-1 based on predefined preferences. This is shown in Table 2, which presents an example of interface-selection preferences that are used by the given communication device to select an interface for a link in the communication session.

TABLE 1 if (UDP NOT Attempted)
   use UDP;
else
   if (Allocbind Response over UDP)
     use UDP;
   else
     if (TCP NOT Attempted)
       use TCP;
     else
       if (Allocbind Response over TCP)

TABLE 1-continued

```
        use TCP;
      else
        use TCP-SSL;
      endif;
    endif;
  endif;
endif;
```

TABLE 2

1) Predefined client preference
2) Wi-Fi
3) Cellular

Figure 7:
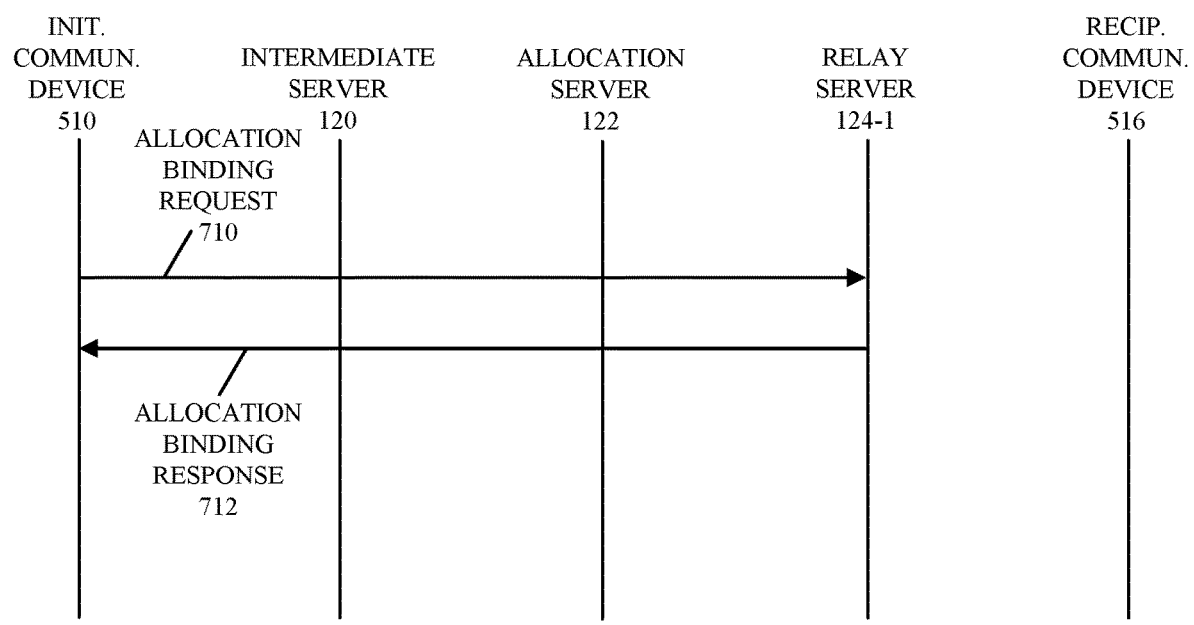
FIG. 7 is a flow diagram illustrating an example allocation-binding operation during communication among at least some of the electronic devices in FIG. 1.

The predefined hierarchy and/or the predefined preferences may be used to select the transport and the interface by sequentially executing a series of operation commands. Notably, after the invitation operation and/or the allocation operation, an allocation-binding operation may be performed. This is shown in FIG. 7, which presents a flow diagram illustrating an allocation-binding operation during communication among at least some of the electronic devices in FIG. 1. During the allocation-binding operation, initiating communication device 510 may send an allocation binding request 710, e.g., an 'Allocbind Request' to relay server 124-1 using the relay-server address to bind initiating communication device 510 and relay server 124-1 in the communication session. This allocation binding request may include information such as: a requested transport type (e.g., UDP, which may be the first transport type in the predefined hierarchy in Table 1), message-integrity information (e.g., the relay-session key, which may include or specify a secure hashing function, such as SHA-20), the relay-session token, optional software and/or optional data. In response, relay server 124-1 may transmit an allocation binding response 712, e.g., an 'Allocbind Response'. This allocation binding response may include information such as: a mapped address (e.g., an XOR-mapped address), a channel number, optional software and/or message-integrity information. For example, the channel number may be specified using a 4B header, with 2B for the channel number and 2B for the length. However, a wide variety of data formats and/or lengths may be used for the channel number. Note that the allocation binding may reserve resources for or set up a connection between initiating communication device 510 and relay server 124-1 for use in the communication session.

Figure 8:
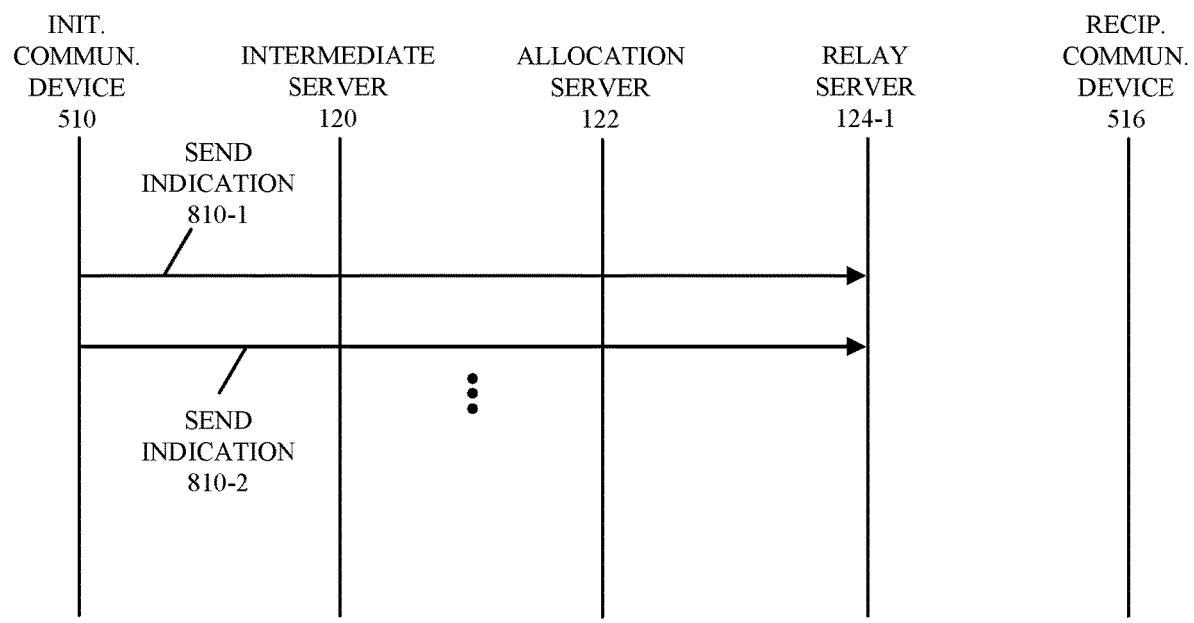
FIG. 8 is a flow diagram illustrating an example session-connected-initiation operation during communication among at least some of the electronic devices in FIG. 1.

Next, a session-connected-initiation operation may be performed. This is shown in FIG. 8, which presents a flow diagram illustrating a session-connected-initiation operation during communication among at least some of the electronic devices in FIG. 1. During the session-connection-initiation operation, initiating communication device 510 may transmit a send indication 810-1 (which is sometimes referred to as a 'connection indication') to relay server 124-1 using the relay-server address to confirm a connection between initiating communication device 510 and relay server 124-1 in the communication session. This send indication may indicate that the initiator (initiating communication device 510) is connected, and may include information such as: the transport type, an interface or radio access technology or RAT (e.g., Wi-Fi), MTU, and/or a local address. Note that instances of send indication 810-1 may be repeated until a response is received from recipient communication device 516 (as described further below with reference to FIG. 11).

Figure 9:
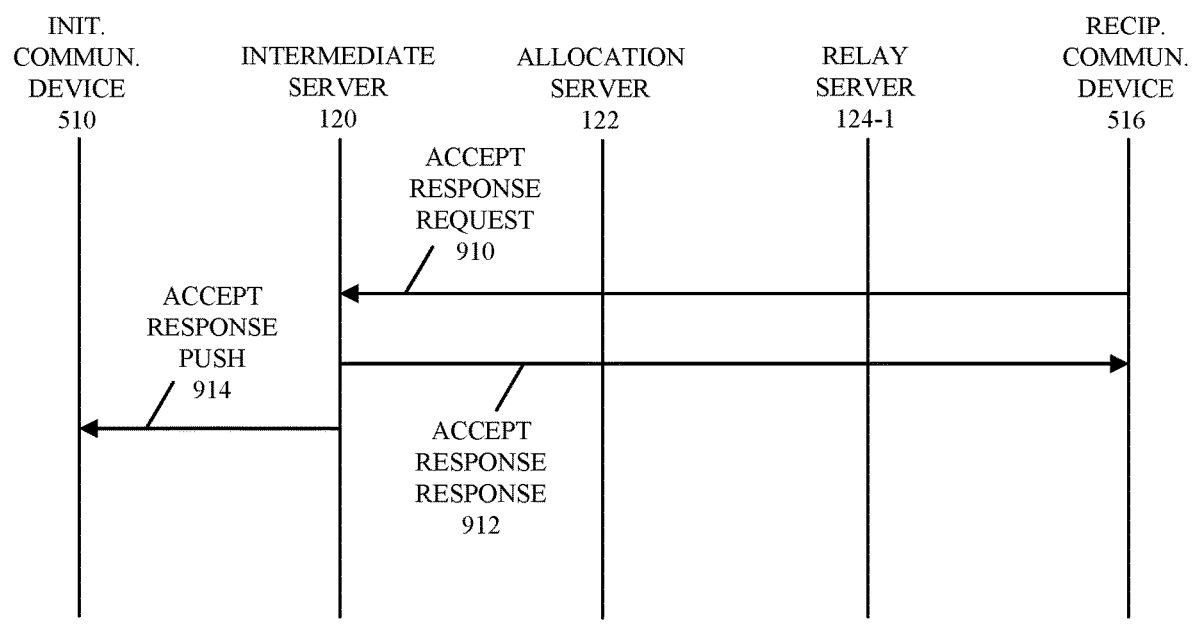
FIG. 9 is a flow diagram illustrating an example accept-response operation during communication among at least some of the electronic devices in FIG. 1.

In response to the invitation operation and/or the allocation operation, recipient communication device 516 may perform an accept-response operation. This is shown in FIG. 9, which presents a flow diagram illustrating an accept-response operation during communication among at least some of the electronic devices in FIG. 1. During the accept-response operation, recipient communication device 516 may receive, from intermediate server 120, an accept response request 910, and may transmit, to intermediate server 120, an accept response response 912. Then, intermediate server 120 may send, to initiating communication device 510, an accept response push 914 (which is sometimes referred to as 'acceptance response'). Note that the accept-response operation may be used by recipient communication device 516 to communicate that it accepts the invitation for the communication session to initiating communication device 510.

Figure 10:
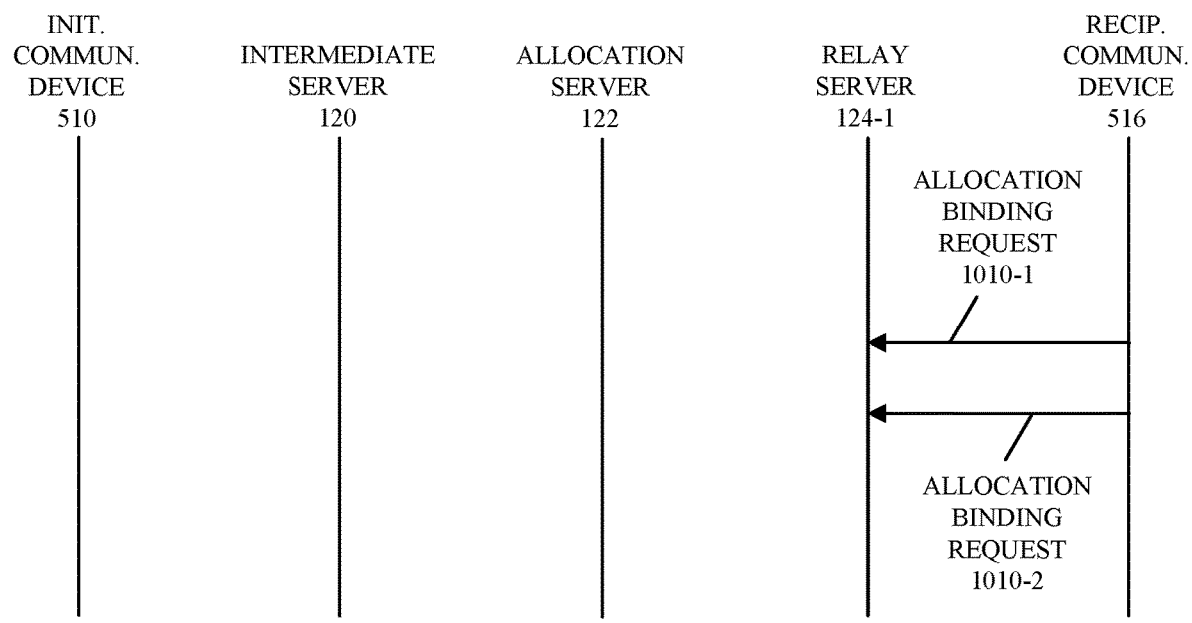
FIG. 10 is a flow diagram illustrating an example allocation-binding operation during communication among at least some of the electronic devices in FIG. 1.

After accepting the invitation for the communication session, recipient communication device 516 may perform an allocation-binding operation. This is shown in FIG. 10, which presents a flow diagram illustrating an allocation-binding operation during communication among at least some of the electronic devices in FIG. 1. During the allocation binding, recipient communication device 516 may send an allocation binding request 1010-1, e.g., an 'Allocbind Request', to relay server 124-1 using the relay-server address to bind recipient communication device 516 and relay server 124-1 in the communication session. This allocation binding request may include information such as: a requested transport type (e.g., UDP, which may be the first transport type in the predefined hierarchy in Table 1), message-integrity information (e.g., the relay-session key, which may include or specify a secure hashing function, such as SHA-20), the relay-session token, optional software and/or optional data. However, in this case, as an illustration, this transport type may be blocked or unsuccessful with relay server 124-1. Consequently, and in contrast with FIG. 7, recipient communication device 516 may not receive an allocation binding response, e.g., an 'Allocbind Response', from relay server 124-1. Consequently, recipient communication device 516 may transmit one or more additional instances of the allocation binding request, e.g. the subsequent allocation binding request 1010-2, e.g., additional 'Allocbind Requests', until a time out occurs (such as after 1, 5, or 10 seconds).

Figure 11:
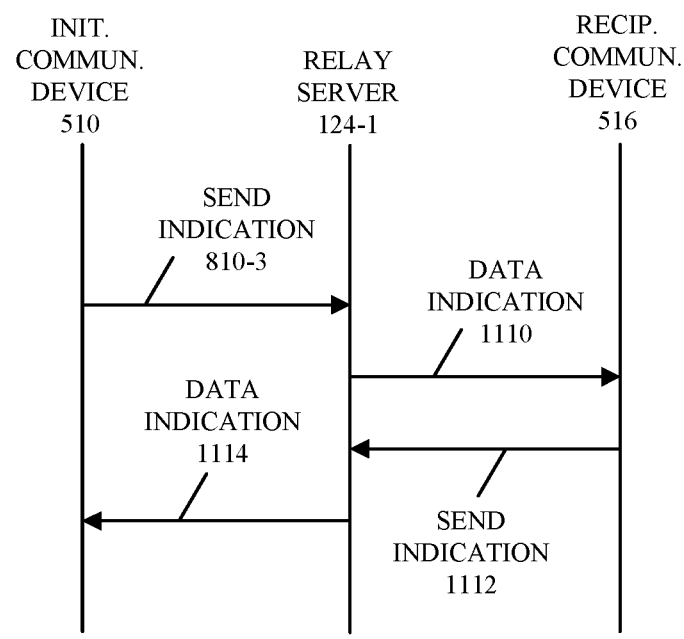
FIG. 11 is a flow diagram illustrating an example session-connected-acknowledgment operation during communication among at least some of the electronic devices in FIG. 1.

Initiating communication device 510 may become aware of this failure when it does not receive a session-connected response from relay server 124-1 (as described further below with reference to FIG. 11). For example, the session-connected response may not be received within a predefined time interval (such as 1, 5 or 10 seconds). In response, initiating communication device 510 may attempt to establish the communication session using UDP, while recipient communication device 516 attempts to set up a link with relay server 124-1 using a different transport type and/or interface based on the predefined hierarchy and the predefined preferences. Therefore, initiating communication device 510 may repeat the allocation operation in FIG. 6, may select UDP and the same interface based on the predefined hierarchy and the predefined preferences, and may perform the allocation-binding operation in FIG. 7 for UDP. Moreover, recipient communication device 516 may select the next transport type (TCP), and may perform the allocation-binding operation in FIG. 7 for TCP. However, in this case, as an illustration, this transport type may also be blocked or unsuccessful with relay server 124-1. Consequently, and in contrast with FIG. 7, recipient communication device 516 may not receive an allocation binding response, e.g., an 'Allocbind Response', from relay server 124-1.

Initiating communication device 510 may become aware of this second failure when it does not receive a session-connected response from relay server 124-1 (as described further below with reference to FIG. 11). For example, once again, the session-connected response may not be received within a predefined time interval (such as 1, 5 or 10 seconds). In response, initiating communication device 510 may attempt to establish the communication session using UDP, while recipient communication device 516 attempts to set up a link with relay server 124-1 using a different transport type and/or interface based on the predefined hierarchy and the predefined preferences. Therefore, initiating communication device 510 may repeat the allocation operation in FIG. 6, may select UDP and the same interface based on the predefined hierarchy and the predefined preferences, and may perform the allocation-binding operation in FIG. 7 for UDP. Moreover, recipient communication device 516 may select the next transport type (TCP-SSL), and may perform the allocation-binding operation in FIG. 7 for TCP-SSL.

In this example, the allocation-binding operation for TCP-SSL may be successful. Consequently, recipient communication device 516 may perform a session-connected-acknowledgment operation. This is shown in FIG. 11, which presents a flow diagram illustrating a session-connected-acknowledgment operation during communication among at least some of the electronic devices in FIG. 1. During the session-connected-acknowledgment operation, initiating communication device 510 may transmit send indication 810-3 to relay server 124-1 using the relay-server address. (In some embodiments, initiating communication device 510 may transmit multiple instances of send indication 810-3 until a session-connected response is received.) Then, relay server 124-1 may send a data indication 1110 to recipient communication device 516. In response, recipient communication device 516 may transmit, to relay server 124-1, send indication 1112 (which is sometimes referred to as a 'session-connected response') to acknowledge that recipient communication device 516 is connected. After receiving send indication 1112, relay server 124-1 may send data indication 1114 (which is also sometimes referred to as a 'session-connected response') to initiating communication device 510 to confirm a connection between recipient communication device 516 and relay server 124-1 in the communication session, and thus to indicate that the communication session has been established.

Once the communication session has been established, either of initiating communication device 510 and recipient communication device 516 can use the communication session to communicate data or information via relay server 124-1.

Figure 12:
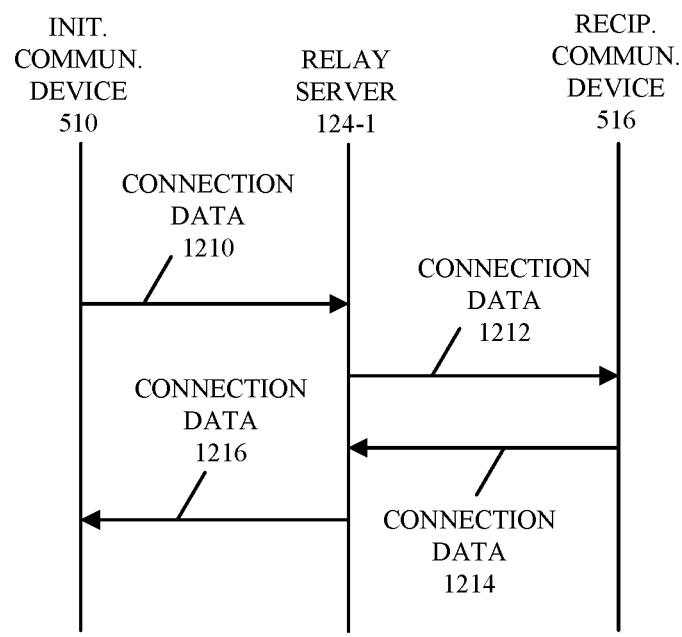
FIG. 12 is a flow diagram illustrating an example exchange-connected-data operation during communication among at least some of the electronic devices in FIG. 1.

However, in some embodiments the communication technique may be used to establish a P2P link between initiating communication device 510 and recipient communication device 516. Notably, in addition to establishing the communication session, the communication protocol may include or define additional operations that may be used to establish a P2P link between initiating communication device 510 and recipient communication device 516. After discovering the IP address(es) of a local interface by communicating with a communication network address translation (NAT) server, connection data may be exchanged using an exchange-connected-data operation. This is shown in FIG. 12, which presents a flow diagram illustrating an exchange-connected-data operation during communication among at least some of the electronic devices in FIG. 1. During the exchange-connected-data operation, initiating communication device 510 may transmit connection data 1210 to relay server 124-1, and relay server 124-1 may transmit connection data 1212 to recipient communication device 516. Subsequently, recipient communication device 516 may transmit connection data 1214 to relay server 124-1, and relay server 124-1 may transmit connection data 1216 to initiating communication device 510. The connection data 1214 and the connection data 1216 may include the same data.

Figure 13:
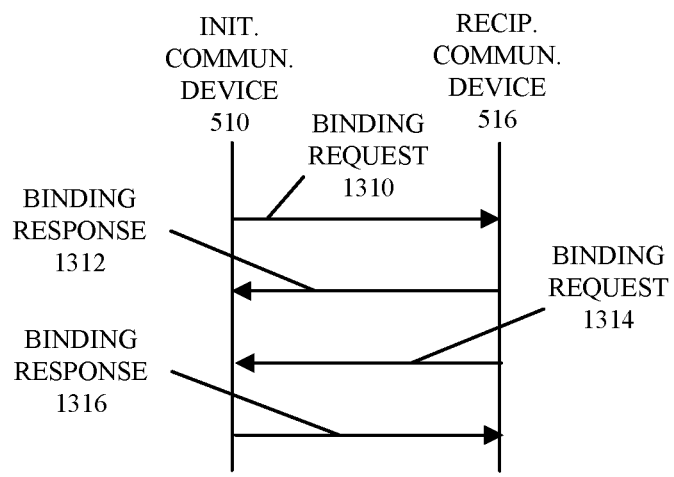
FIG. 13 is a flow diagram illustrating an example peer-to-peer (P2P) establishment operation during communication among at least some of the electronic devices in FIG. 1.

Next, initiating communication device 510 and recipient communication device 516 may perform a P2P establishment operation. This is shown in FIG. 13, which presents a flow diagram illustrating a P2P establishment operation during communication among at least some of the electronic devices in FIG. 1. During the P2P establishment operation, initiating communication device 510 may transmit, to recipient communication device 516, a binding request 1310 with connection data (such as an IP address and a port). In response, recipient communication device 516 may send a binding response 1312 to initiating communication device 510. Then, recipient communication device 516 may transmit, to initiating communication device 510, a binding request 1314 with connection data. In response, initiating communication device 510 may send a binding response 1316 to recipient communication device 516.

As discussed previously, during the communication technique, a given communication device (such as one of initiating communication device 510 and recipient communication device 516) may establish two or more links with relay server 124-1. Moreover, these links may be maintained by periodically transmitting keep-alive messages to relay server 124-1 (such as after 10 to 30 seconds have elapsed without activity on a link).

For example, after establishing a communication session with a Wi-Fi link between initiating communication device 510 and relay server 124-1, and a Wi-Fi link with recipient communication device 516 (which may be denoted as a 'W-W link'), initiating communication device 510 may set up another link. If the local interfaces at the initiating communication device 510 and recipient communication device 516, respectively, are Wi-Fi and cellular, and Wi-Fi, then initiating communication device 510 may set up another link using cellular between initiating communication device 510 and relay server 124-1, and Wi-Fi between recipient communication device 516 and relay server 124-1 (which may be denoted as a 'C-W link'). After this interface selection, initiating communication device 510 may perform the allocation operation in FIG. 6 and the allocation-binding operation in FIG. 7 for UDP and cellular. Moreover, recipient communication device 516 may perform the allocation-binding operation in FIG. 7 for UDP and Wi-Fi.

Figure 14:
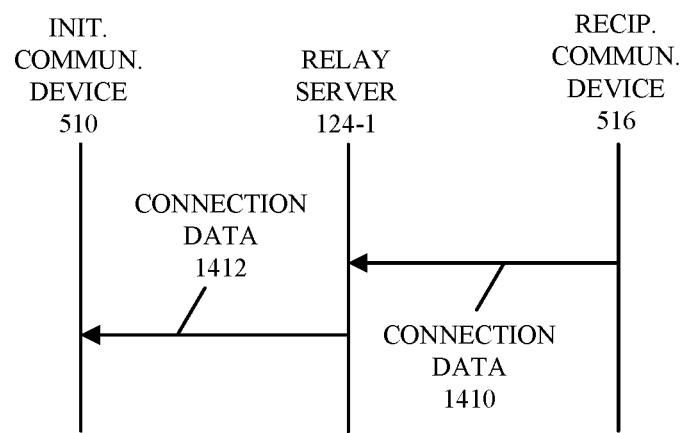
FIG. 14 is a flow diagram illustrating an example interface-change operation during communication among at least some of the electronic devices in FIG. 1.

Next, a new link may be set up after the interface change using an interface-change operation. This is shown in FIG. 14, which presents a flow diagram illustrating an interface-change operation during communication among at least some of the electronic devices in FIG. 1. Notably, recipient communication device 516 may transmit connection data 1410 to relay server 124-1, and relay server 124-1 may transmit connection data 1412 to initiating communication device 510. Based on this connection data, initiating communication device 510 and recipient communication device 516 may repeat the P2P establishment operation in FIG. 13 to establish a new P2P link. Thus, the communication technique may be used to dynamically detect and adapt to changes in the links between initiating communication device 510, relay server 124-1 and recipient communication device 516.

At least some of the aforementioned operations may be repeated to establish additional links. For example, if the local interfaces at the initiating communication device 510 and recipient communication device 516, respectively, are Wi-Fi and cellular, and Wi-Fi and cellular, and the existing links include W-W and C-W, then initiating communication device 510 may set up another link using cellular between initiating communication device 510 and relay server 124-1, and cellular between recipient communication device 516 and relay server 124-1 (which may be denoted as a 'C-C link'). After this interface selection, initiating communication device 510 may perform the allocation operation in FIG. 6 and the allocation-binding operation in FIG. 7 for UDP and cellular. Moreover, recipient communication device 516 may perform the allocation-binding operation in FIG. 7 for UDP and cellular.

We now describe embodiments of an electronic device. FIG. 15 presents a block diagram of an electronic device 1500 (which may be an access point, another electronic device, such as a station, an initiating communication device or a recipient communication device) in accordance with some embodiments. This electronic device includes processing subsystem 1510, memory subsystem 1512, and networking subsystem 1514. Processing subsystem 1510 includes one or more devices configured to perform computational operations. For example, processing subsystem 1510 can include one or more microprocessors, application-specific integrated circuits (ASICs), microcontrollers, programmable-logic devices, and/or one or more digital signal processors (DSPs).

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: one or more program modules or sets of instructions (such as program module 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Figure 15:
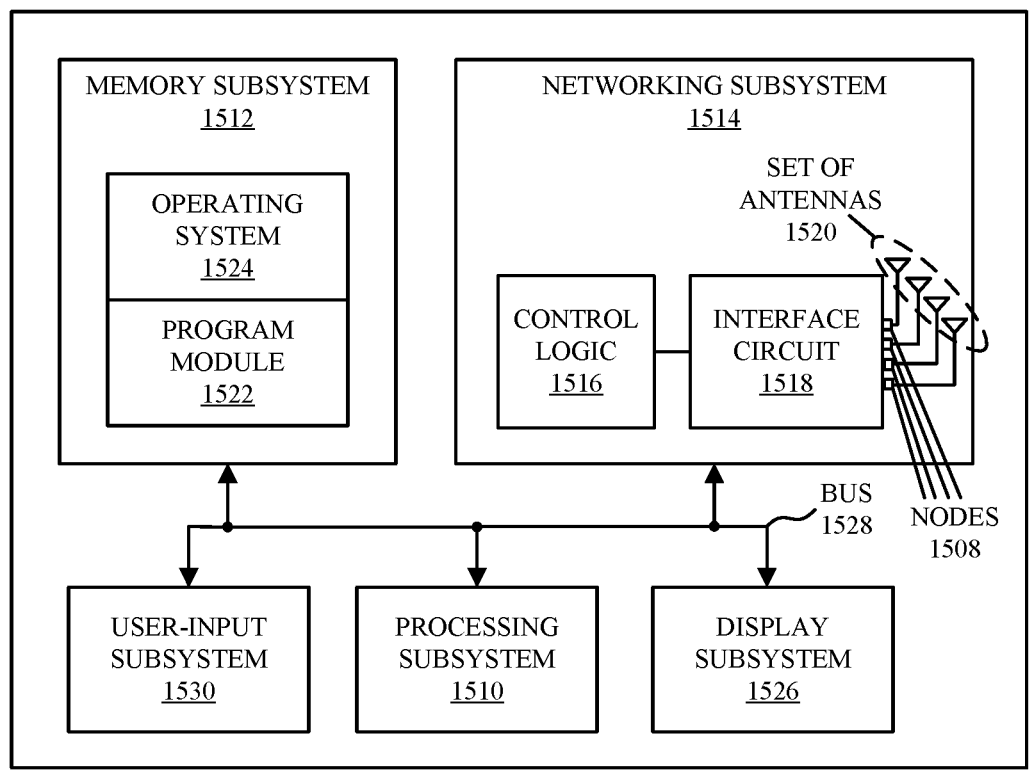
FIG. 15 is a block diagram illustrating an example electronic device, such as one of the electronic devices of FIG. 1.

Networking subsystem 1514 includes one or more devices configured to couple to and communicate on a wired and/or wireless network (i.e., to perform network operations), including: control logic 1516, an interface circuit 1518 and a set of antennas 1520 (or antenna elements) in an adaptive array that can be selectively turned on and/or off by control logic 1516 to create a variety of optional antenna patterns or 'beam patterns.' (While FIG. 15 includes set of antennas 1520, in some embodiments electronic device 1500 includes one or more nodes, such as nodes 1508, e.g., a pad, which can be coupled to set of antennas 1520. Thus, electronic device 1500 may or may not include set of antennas 1520.) For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices.

Within electronic device 1500, processing subsystem 1510, memory subsystem 1512, and networking subsystem 1514 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface. For example, electronic device 1500 may include: a cellular telephone or a smart-phone, a tablet computer, a laptop computer, a notebook computer, a personal or desktop computer, a netbook computer, a media player device, an electronic book device, a MiFi® device, a smart-watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments program module 1522 is included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication avoidance technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1522, operating system 1524 (such as a driver for interface circuit 1518) or in firmware in interface circuit 1518. Alternatively or additionally, at least some of the operations in the communication technique may be implemented in a physical layer, such as hardware in interface circuit 1518. In some embodiments, the communication avoidance technique is implemented, at least in part, in a MAC layer and/or in a physical layer in interface circuit 1518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An initiating communication device, comprising:
one or more nodes configured to communicatively couple to an antenna; and
an interface circuit, communicatively coupled to the one or more nodes, configured to communicate with a relay server;
a processor, communicatively coupled to the interface circuit and memory, configured to execute a program module; and
the memory configured to store the program module, the program module comprising instructions for:
establishing a communication session between the interface circuit and a recipient communication device via the relay server, wherein establishing the communication session involves:
selecting a first transport and a first interface for a first link between the interface circuit and the relay server, and
selecting a second transport and a second interface for a second link between the relay server and the recipient communication device; and
wherein:
the first transport for the first link and the second transport for the second link are selected based on preferred types of transports, and
the preferred types of transports comprise a first preferred type of transport that is used as the first transport if a first response is received by the interface circuit from the relay server using the first preferred type of transport, and a second preferred type of transport that is used as the second transport if a second response is received by the recipient communication device from the relay server using the second preferred type of transport.

2. The initiating communication device of claim 1, wherein the first transport for the first link and the second transport for the second link are selected in a hierarchical manner using a predefined hierarchy of transport types based on the preferred types of transports.

3. The initiating communication device of claim 2, wherein the predefined hierarchy gives preference to User Datagram Protocol (UDP) over Transmission Control Protocol (TCP), and gives preference to TCP over TCP-Secure Socket Layer (SSL).

4. The initiating communication device of claim 1, wherein the first interface for the first link and the second interface for the second link are selected based on predefined preferences for different types of interfaces.

5. The initiating communication device of claim 4, wherein, in the predefined preferences, a defined client preference supersedes other preferences, and a Wi-Fi interface is preferred over a cellular-telephone interface.

6. The initiating communication device of claim 1, wherein establishing the communication session involves setting up two or more links between the interface circuit and the relay server, the recipient communication device and the relay server, or both.

7. The initiating communication device of claim 6, wherein the program module further comprises instructions for maintaining at least one backup link between at least one of: the interface circuit and the relay server, and the recipient communication device and the relay server.

8. The initiating communication device of claim 1, wherein the first transport and the first interface for the first link are selected independently of the second transport and the second interface for the second link.

9. The initiating communication device of claim 1, wherein the program module further comprises instructions for:
dynamically detecting changes to one of the first interface and the second interface in the communication session; and
modifying at least one of the first link and the second link based on the detected changes.

10. A non-transitory computer-readable storage medium storing instructions that, when executed by a processor included in an initiating communication device, cause a communication session with a recipient communication device to be established via a relay server, by carrying out one or more operations that comprise:
establishing the communication session with the recipient communication device via the relay server,
wherein establishing the communication session involves transport and interface selection for a first link between the initiating communication device and the relay server, and transport and interface selection for a second link between the relay server and the recipient communication device, and
wherein:
the first transport for the first link and the second transport for the second link are selected based on preferred types of transports, and
the preferred types of transports comprise a first preferred type of transport that is used as the first transport if a first response is received by the interface circuit from the relay server using the first preferred type of transport, and a second preferred type of transport that is used as the second transport if a second response is received by the recipient communication device from the relay server using the second preferred type of transport;
dynamically detecting changes to one or more interfaces in the communication session; and
modifying at least one of the first link and the second link based on the detected changes.

11. The non-transitory computer-readable storage medium of claim 10, wherein transports for the first link and the second link are selected in a hierarchical manner based on a predefined hierarchy of transport types.

12. The non-transitory computer-readable storage medium of claim 10, wherein interfaces for the first link and the second link are selected based on predefined preferences for different types of interfaces.

13. The non-transitory computer-readable storage medium of claim 10, wherein establishing the communication session involves setting up two or more links with the relay server, between the recipient communication device and the relay server, or both.

14. The non-transitory computer-readable storage medium of claim 10, wherein the operations further comprise maintaining at least one backup link with the relay server, maintaining at least one backup link between the recipient communication device and the relay server, or both.

15. The non-transitory computer-readable storage medium of claim 10, wherein at least one of transports and interfaces differ between the first link and the second link.

16. A method for establishing a communication session with a recipient communication device via a relay server, comprising:

by an initiating communication device:
establishing the communication session with the recipient communication device via the relay server,
wherein establishing the communication session involves transport and interface selection for a first link with the relay server, and transport and interface selection for a second link between the relay server and the recipient communication device, and wherein:
the first transport for the first link and the second transport for the second link are selected based on preferred types of transports, and
the preferred types of transports comprise a first preferred type of transport that is used as the first transport if a first response is received by the interface circuit from the relay server using the first preferred type of transport, and a second preferred type of transport that is used as the second transport if a second response is received by the recipient communication device from the relay server using the second preferred type of transport; and wherein the first transport and a first interface for the first link are selected independently of a second transport and a second interface for the second link.

17. The method of claim 16, wherein:
transports for the first and second links are selected in a hierarchical manner using a predefined hierarchy of transport types based on the preferred types of transports; and
interfaces for the first and second links are selected based on predefined preferences for different types of interfaces.

18. The method of claim 16, wherein establishing the communication session by the initiating communication device involves setting up two or more links with the relay server, the recipient communication device and the relay server, or both.

19. The method of claim 16, wherein the method further comprises, by the initiating communication device, maintaining at least one backup link with the relay server, between the recipient communication device and the relay server, or both.

20. The method of claim 16, wherein at least one of the first and second transports and the first and second interfaces are different for the first link and the second link.

* * * * *